(12) United States Patent  
Hutton et al.

(10) Patent No.: US 7,784,008 B1  
(45) Date of Patent: Aug. 24, 2010

(54) PERFORMANCE VISUALIZATION SYSTEM

(75) Inventors: Michael D. Hutton, Mountain View, CA (US); David Karchmer, Los Altos, CA (US); Zhiru Zhang, Los Angeles, CA (US)

(73) Assignee: Altera Corporation, San Jose, CA (US)

( * ) Notice: Subject to any disclaimer, the term of this patent is extended or adjusted under 35 U.S.C. 154(b) by 213 days.

(21) Appl. No.: 11/330,931

(22) Filed: Jan. 11, 2006

(51) Int. Cl.  
*G06F 17/50* (2006.01)

(52) U.S. Cl. ................................ 716/12; 716/1; 716/11

(58) Field of Classification Search ...................... 716/1, 716/2, 6, 12, 11  
See application file for complete search history.

(56) References Cited

U.S. PATENT DOCUMENTS

| | | | | |
|---|---|---|---|---|
| 5,493,524 A | * | 2/1996 | Guttag et al. ............... | 708/709 |
| 6,066,178 A | * | 5/2000 | Bair et al. ..................... | 716/2 |
| 7,043,682 B1 | * | 5/2006 | Ferguson ..................... | 714/796 |
| 7,325,215 B2 | * | 1/2008 | Dinter et al. .................. | 716/11 |
| 7,391,288 B1 | * | 6/2008 | Itoh et al. .................... | 333/219 |

* cited by examiner

*Primary Examiner*—Thuan Do  
(74) *Attorney, Agent, or Firm*—Townsend and Townsend and Crew LLP (57) ABSTRACT

A visualization displays user designs and performance information at different levels of detail. Related register bits are combined into a metaregister and displayed as a graph node. The set of paths and associated combinatorial logic between two or more metaregisters are collapsed into a metapath and displayed as a graph connection. The set of paths associated with a metapath can be selectively revealed in response to user input. Metapaths can be annotated with performance information of its associated paths, such as timing, area, and power consumption information. The annotated performance information can represent performance information of one or more paths or aggregate attributes of the set of paths. Paths associated with control signals and finite state machines can be identified and displayed as separate graph connections.

25 Claims, 13 Drawing Sheets

| tsu | | | | | |
|---|---|---|---|---|---|
| | Slack | Required tsu | Actual tsu | From | To | To Clock |
| 1 | N/A | None | 2.751 ns | data_in[8] | reg_data_in[8] | clk |
| 2 | N/A | None | 2.660 ns | data_in[0] | reg_data_in[0] | clk |
| 3 | N/A | None | 2.498 ns | data_in[12] | reg_data_in[12] | clk |
| 4 | N/A | None | 2.448 ns | data_in[10] | reg_data_in[10] | clk |
| 5 | N/A | None | 2.426 ns | data_in[1] | reg_data_in[1] | clk |
| 6 | N/A | None | 2.418 ns | data_in[7] | reg_data_in[7] | clk |
| 7 | N/A | None | 2.413 ns | shift_by[9] | reg_shift_by[9] | clk |
| 8 | N/A | None | 2.413 ns | shift_by[7] | reg_shift_by[7] | clk |
| 9 | N/A | None | 2.412 ns | data_in[5] | reg_data_in[5] | clk |
| 10 | N/A | None | 2.412 ns | shift_by[4] | reg_shift_by[4] | clk |
| 11 | N/A | None | 2.403 ns | shift_by[3] | reg_shift_by[3] | clk |
| 12 | N/A | None | 2.297 ns | data_in[15] | reg_data_in[15] | clk |
| 13 | N/A | None | 2.271 ns | data_in[9] | reg_data_in[9] | clk |
| 14 | N/A | None | 2.267 ns | data_in[2] | reg_data_in[2] | clk |
| 15 | N/A | None | 2.259 ns | shift_by[5] | reg_shift_by[5] | clk |
| 16 | N/A | None | 2.257 ns | shift_by[2] | reg_shift_by[2] | clk |
| 17 | N/A | None | 2.255 ns | shift_by[6] | reg_shift_by[6] | clk |
| 18 | N/A | None | 2.253 ns | data_in[14] | reg_data_in[14] | clk |
| 19 | N/A | None | 2.243 ns | shift_by[12] | reg_shift_by[12] | clk |
| 20 | N/A | None | 2.242 ns | shift_by[14] | reg_shift_by[14] | clk |
| 21 | N/A | None | 2.216 ns | data_in[3] | reg_data_in[3] | clk |
| 22 | N/A | None | 2.176 ns | shift_by[0] | reg_shift_by[0] | clk |
| 23 | N/A | None | 2.175 ns | data_in[13] | reg_data_in[13] | clk |
| 24 | N/A | None | 2.166 ns | shift_by[11] | reg_shift_by[11] | clk |

PERFORMANCE VISUALIZATION SYSTEM

BACKGROUND OF THE INVENTION

The present invention relates to the field of software for designing integrated circuits. A typical design cycle for an integrated circuit, referred to as compilation, starts with an extraction phase, followed by a logic synthesis phase, and, depending upon the target hardware architecture, either a layout phase or fitting and assembly phases.

In addition to implementing their desired functions, designs typically must satisfy one or more additional design goals, such as operating speed, power consumption, and/or programmable device resource consumption. Typically, the predicted performance of a design with respect to one or more design goals is determined through simulation or analysis following a phase of the compilation. The designer can evaluate the predicted performance of the design and decide to either accept the results of the compilation or modify the design to improve its predicted performance, and hopefully its actual performance as well.

Visualization applications assist designers in evaluating predicted performance of a design. Visualization applications present predicted performance information of a design in a number of different graphical and text formats. Using visualization applications, designers can identify portions of the design that do not satisfy design goals. Visualization applications may also help designers identify portions of the design that can be improved to meet or exceed design goals.

Many typical digital designs include a number of registers. Each register is capable of storing one or more bits of data. Registers are often connected together via combinatorial logic. In many cases, the set of connections between two or more registers includes a large number of paths, each connecting one bit of a source register with one or more bits of at least one destination register. For example, there are up to 256 different paths between two 16 bit registers.

Visualization applications typically present predicted performance information on a path level view. These visualization applications annotate each path with its predicted performance information. As a result, designers tend to focus their optimization efforts on improving the performance of individual paths. However, the performance of paths connected with the same registers often are interrelated. Thus, when a designer improves the performance, such as the timing, of one path between registers, the performance of another path between these registers may get worse. In these situations, the designer merely shifts a problem to different paths, rather than finding a solution that improves the performance of the overall design. This problem can occur in any type of integrated circuit design and is especially frequent with programmable devices such as field programmable gate arrays, which route all of the paths between source and destination registers independently.

It is therefore desirable for a visualization system and method to present performance information of designs at higher levels of abstraction to enable designers to efficiently evaluate interrelated paths and portions of the design.

BRIEF SUMMARY OF THE INVENTION

An embodiment of the invention displays user designs and performance information at different levels of detail. Related register bits are combined into a metaregister and displayed as a graph node. The set of paths and associated combinatorial logic between two or more metaregisters are collapsed into a metapath and displayed as a graph connection. The set of paths associated with a metapath can be selectively revealed in response to user input. Metapaths can be annotated with performance information of its associated paths, such as timing, area, and power consumption information. The annotated performance information can represent performance information of one or more paths or aggregate attributes of the set of paths. Paths associated with control signals and finite state machines can be identified and displayed as separate graph connections.

In an embodiment, a visualization of a digital design comprises a first node and a second node. The first node represents a first metaregister comprising at least one bit of a first register and the second node represents a second metaregister comprising at least one bit of a second register. The visualization includes a graph connection connecting the first and second nodes. The graph connection represents a metapath comprising a plurality of paths and associated combinatorial logic between the first and second metaregisters.

In an further embodiment, the graph connection includes an annotation providing performance information of the metapath. Embodiments can include performance information such as timing information, power consumption information, area information, or switching activity. In further embodiments, the performance information includes an aggregate representation of performance information of the plurality of paths. Embodiments of the aggregate representation of performance information may include a probability distribution function or histogram.

In another embodiment, the graph connection is adapted to display at least a portion of the plurality of paths and associated combinatorial logic of the metapath in response to a user input. In yet a further embodiment, the displayed portion of the plurality of paths and associated combinatorial logic are adapted to be collapsed into the graph connection in response to a second user input.

In an additional embodiment, the first and second nodes are a result of register folding of a plurality of register bits of a design. In another embodiment, the graph connection is a result of a comb-cone traversal to identify the plurality of paths and associated combinatorial logic between the first and second metaregisters.

BRIEF DESCRIPTION OF THE DRAWINGS

The invention will be described with reference to the drawings, in which.

In the drawings, the use of identical reference numbers indicates similar elements.

DETAILED DESCRIPTION OF THE INVENTION

Figure 1A:
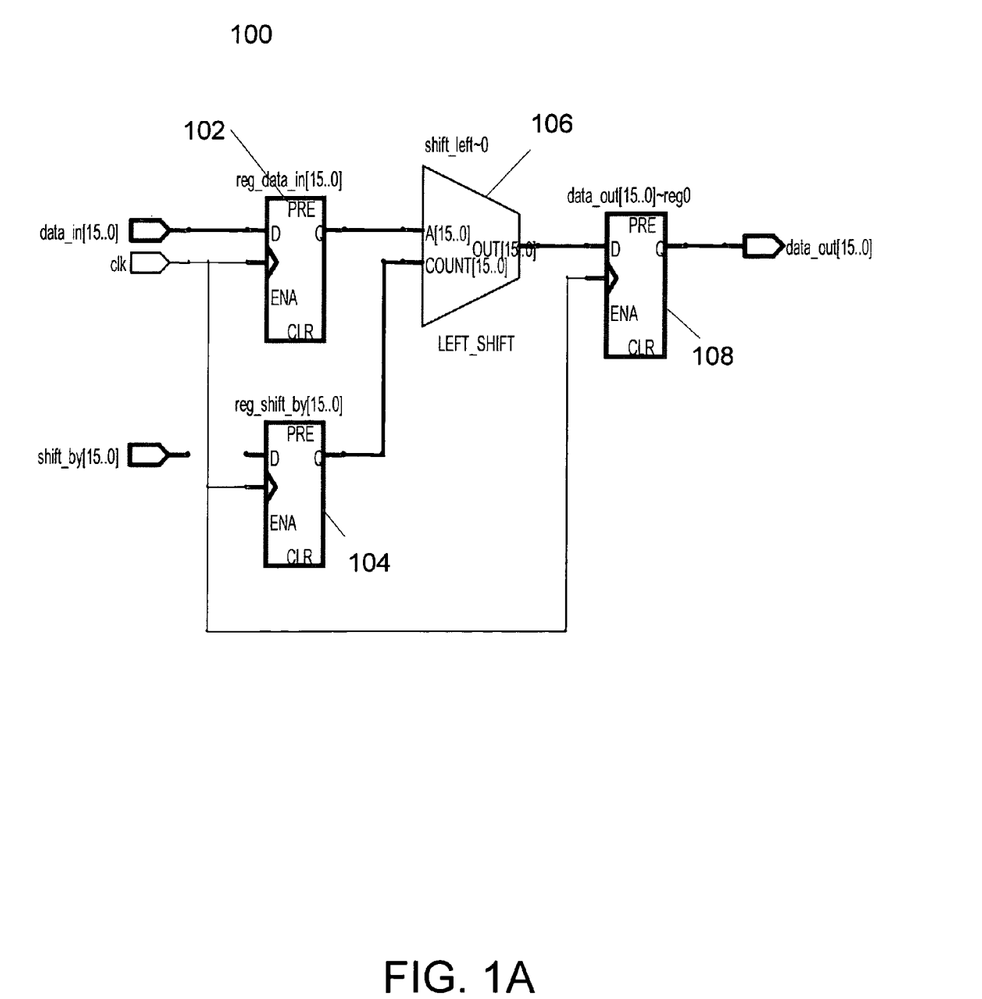
FIGS. 1A-1D illustrate an example user design and the application of prior performance visualization systems.

FIG. 1A illustrates an example circuit design 100. Design 100 is a 16-bit barrel shifter. Design 100 is capable of storing a 16 bit input value in register 102 and 16-bit shift value in register 104. In response to the shift value in register 104, a shift unit 106 shifts the value in register 102 to the left by the shift value in register 104 and stores the result in 16-bit register 108.

Figure 1B:
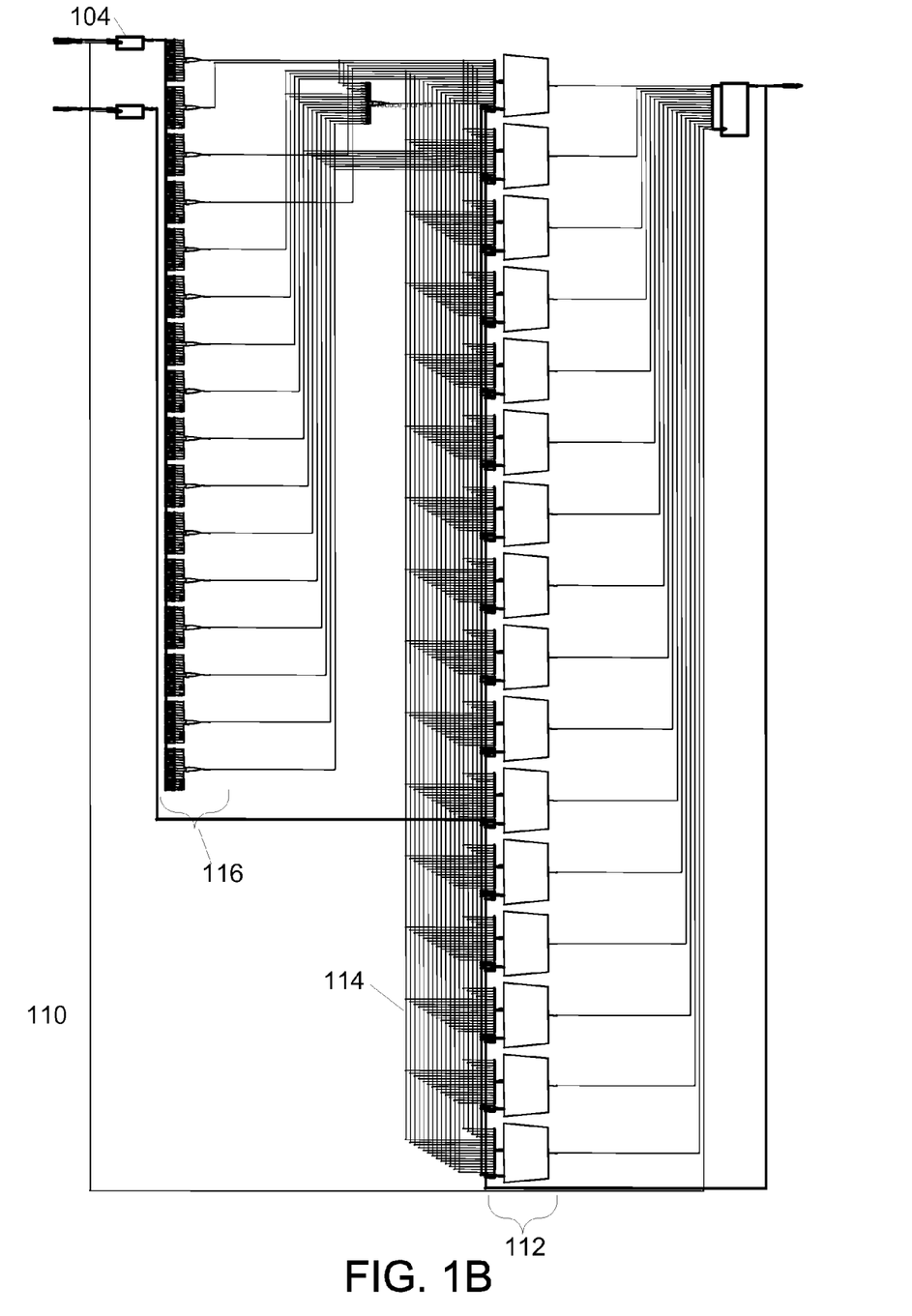

FIG. 1B illustrates schematic 110 of design 100. Schematic 110 shows that the shift unit 108 is comprised of a set of multiplexers 112. In schematic 110, the output of the shift value register 104 is connected by sets of combinatorial logic 116 with the select inputs of the set of multiplexers 112. As can be seen in schematic 110, the set of paths 114 between the sets of combinatorial logic 116 and the set of multiplexers 112 is large and complicated.

Figure 1C:
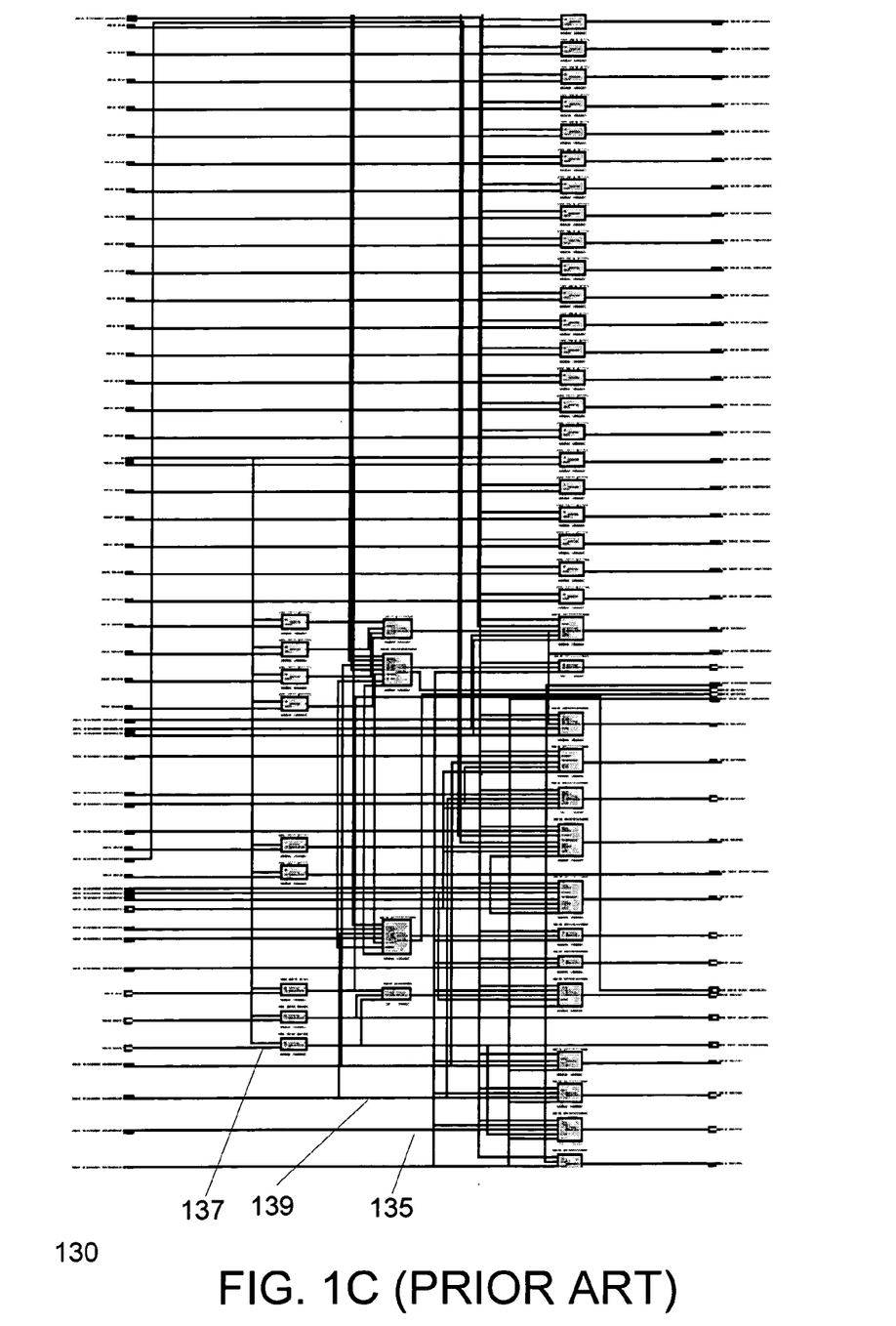

FIG. 1C illustrates an example display 130 of a prior performance visualization application showing design 100. In example display 130, the prior performance visualization application annotates each path of the design, such as paths 135, 137, and 139, with performance information, such as predicted timing information.

Figure 1D:
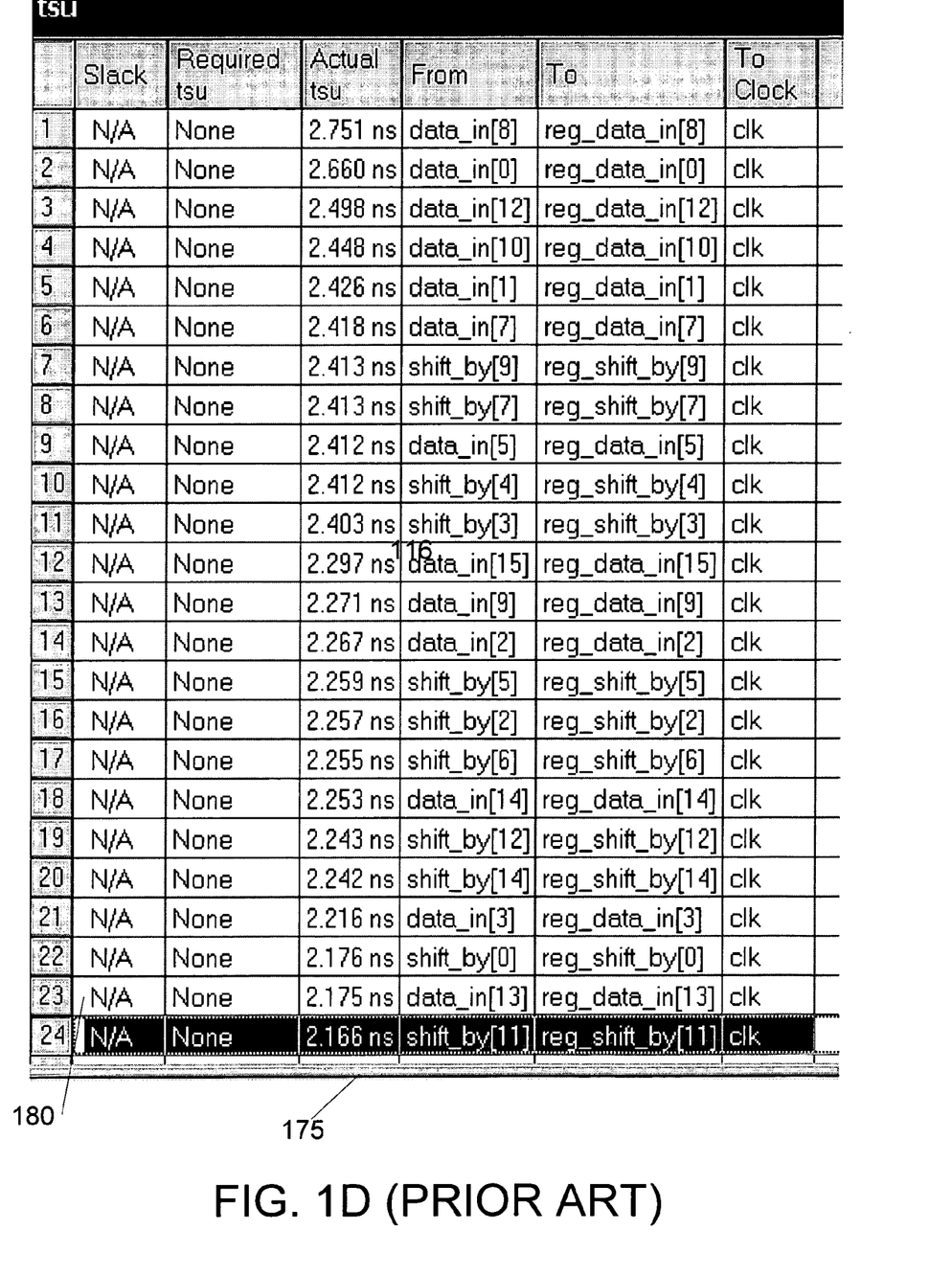

FIG. 1D illustrates an example display 175 of a prior performance visualization application showing design 100. In example display 175, performance information, such as predicted timing performance, is displayed in a tabular format. Each table entry, such as entry 180, displays performance information and other information, such as the source and destination, associated with a single path of the design 100.

In designs with hundreds, thousands, or more paths, the amount of performance information presented by these visualization applications is overwhelming to a designer. Moreover, the level of detail presented by these visualization applications tends to focus the designer's efforts on optimizing or correcting individual paths in the design, rather than overall high-level structure of the design. As a result, designers using prior visualization applications often waste time and effort shifting a problem between interrelated paths, rather than correcting an underlying structural problem in the design.

Figure 2:
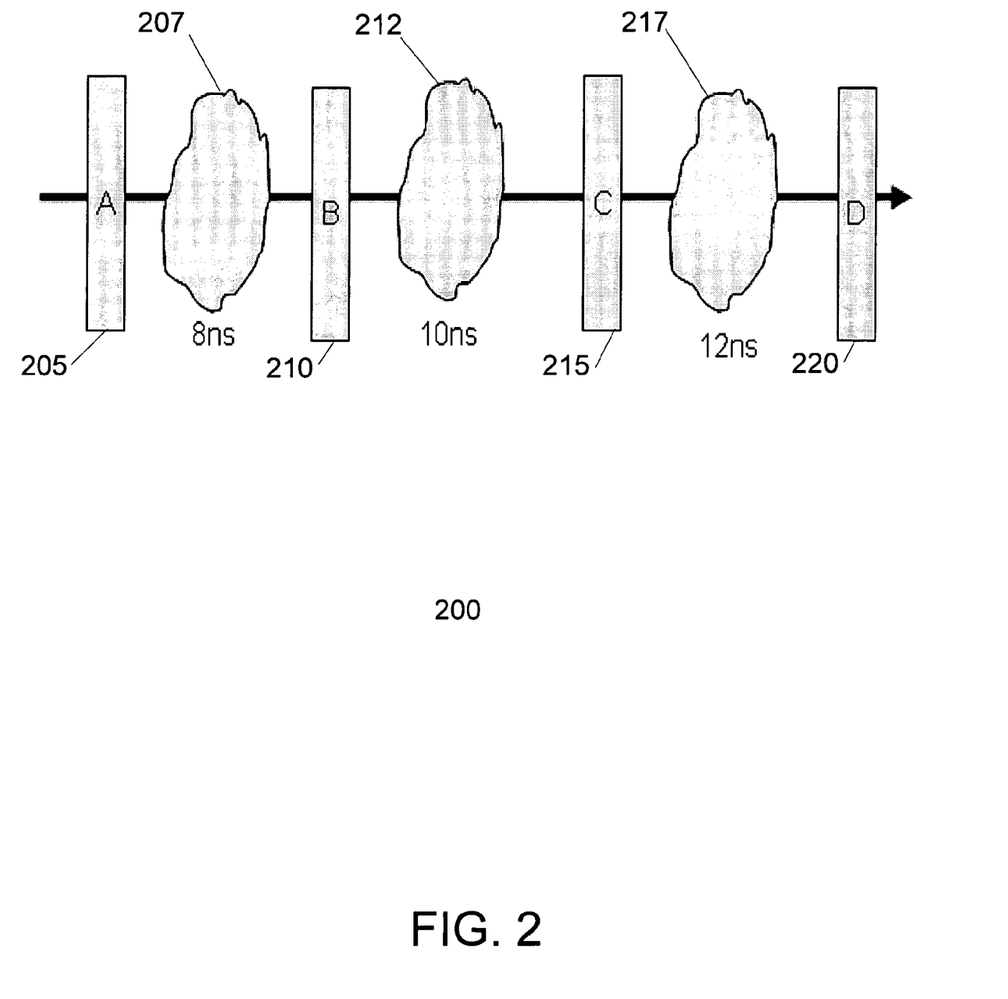
FIG. 2 illustrates a performance visualization of an example user design according to an embodiment of the invention.

FIG. 2 illustrates an example performance visualization 200 of an example user design according to an embodiment of the invention. Example performance visualization 200 groups all or a portion of the bits of one or more registers together in a single group, referred to a metaregister. For example, metaregisters 205, 210, 215, and 220 each represent multiple bits of different registers.

Additionally, example performance visualization 200 collapses the numerous paths between two or more metaregisters into a metapath. Example performance visualization 200 displays metapaths 207, 212, and 217. A single metapath can represent all of the paths and associated combinatorial logic between one or more source metaregisters and a destination metaregister or between a source metaregister and one or more destination metaregisters. For example, metapath 207 represents all of the paths and combinatorial logic between metaregisters 205 and 210. In an embodiment, the performance visualization 200 aggregates performance information of the paths within a metapath and presents metapaths annotated with their aggregate performance information. For example, metapath 207 include aggregate performance information 222. In this example, the aggregate performance information 222 represents a timing value, such as largest delay value for one of the paths in metapath 207.

As discussed detail below, embodiments of the example performance visualization 200 may be interactive, allowing designers to interactively view the design in different levels of hierarchical detail, from a top-level view with only a few metaregisters and metapaths down to a low-level view with individual register bits and paths, as well as any level of detail in between.

Figure 3:
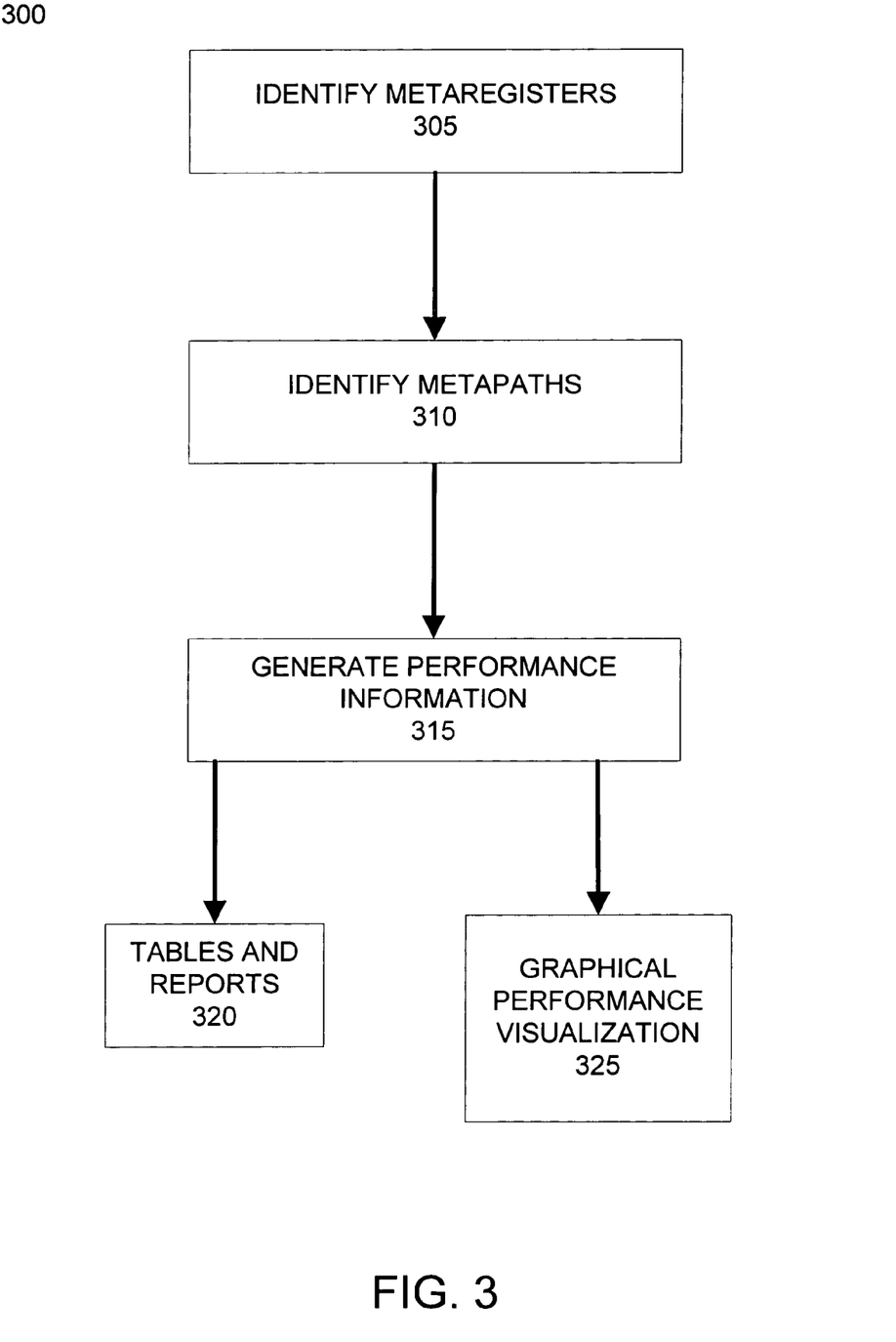
FIG. 3 illustrates a method of creating a performance visualization according to an embodiment of the invention.

FIG. 3 illustrates a method 300 of creating a performance visualization according to an embodiment of the invention. Method 300 receives a design and performance information for each path. The goal of method 300 is to analyze the design to identify related paths and related register bits, thereby enabling the creation of metapaths and metaregisters at any desired level of detail.

Step 305 identifies metaregisters in the design. In an embodiment, step 305 performs register folding to identify related register bits that can be potentially combined to form a metaregister. Register folding identifies register bits having common characteristics, such as being associated with a common bus, and groups these register bits into metaregisters. An example register folding algorithm is illustrated by the pseudo-code in table 1.

TABLE 1

Example Register Folding Pseudocode

```
register_fold( )
{
    foreach node
        if node is a register
            compute compressed node-name
            add node_name to node_name list
            add compressed_name to bus_name list
    foreach bus in bus_name list
        generate a unique bus_id
        associate bus_id with all nodes having same compressed_name
        if size of bus (#node bits) < tolerance
            drop the bus as "not a bus" by ignoring it in later
            processing
    return bus_id list
}
compute_compressed_node_name(name)
{
    remove special characters from name
    match '[' and ']' for bit id
    use multiple combinations to account for different names processing
during synthesis
    return computed_name
}
```

Step 310 identifies metapaths in the design. In an embodiment, step 310 performs comb-cone traversal to identify all of the paths and associated combinatorial logic gates between two or more metaregisters. The set of paths and associated combinatorial logic gates are combined to form one or more metapaths. An example register folding algorithm is illustrated by the pseudo-code in table 2.

TABLE 2

Example Comb-Cone Traversal Pseudocode

```
traverse_comb_cone(node,cone)
{
    depth-first search from node, stopping at register boundaries
    during depth-first search, compute arrival and required times per
standard timing analysis
    as cone endpoints are found, compute their bus_names
    return a list of source registers, bus names and max depth
}
cone_generation( )
{
    - generate the set of all destination_bus to source_bus using the
information gathered by traverse_comb_cone
    - then generate the bus-based Reg-Reg timing graph
}
```

In further embodiments, heuristics or other algorithms can be used to identify finite state machines and control signals (as opposed to data signals). For example, control signals can be identified as having a small number of interrelated paths, as opposed to data signals that have a large number of interrelated paths connecting the same metaregisters. In the example register folding algorithm of table 1, buses having a width less than a tolerance value are not combined into a metaregister. This heuristic distinguishes data signals from control signals in the performance visualization, as discussed in detail below.

In an embodiment, steps 305 and 310 do not combine the registers, paths, and combinatorial logic associated with control signals and/or finite state machines into metapaths and metaregisters. By segregating control signals and/or finite state machines from metaregisters and metapaths, this embodiment facilitates the designer's understanding of the function of the design.

Step 315 generates performance information for metapaths. In an embodiment, step 315 generates performance information for a metapath by aggregating the performance information associated with each of the metapath's constituent paths. The performance information of a metapath can include the minimum, maximum, average, median, sum, and/or other statistical functions or distributions of performance information of paths. For example, the worst-case timing delay value for a metapath would be the maximum of the timing delay values of its paths. Similarly, the worst-case timing slack value for a metapath would be the minimum of the timing slack values of its paths.

In a further embodiment, step 315 derives additional performance information for a metapath from performance and other information associated with its constituent paths. For example, a metapath can include an area or resource usage value based on the total number and other attributes of combinatorial logic gates (and/or logic cells in the case of a programmable device) included in the metapath.

In another example, a metapath can include a power consumption value based on the total number and other attributes of combinatorial logic gates (and/or logic cells in the case of a programmable device) included in the metapath. Power consumption can include static power consumption, which is fixed based on the number and types of combinatorial logic gates included in a path, or dynamic power consumption. A metapath can also include a switching activity value that reflects the frequency that signals in the metapath change value. Switching activity can be used to evaluate dynamic power consumption of a metapath as well as noise issues. Switching activity can be determined or estimated using simulations of the design with test vectors or probabilistic methods.

In a further example, a metapath can include a probability distribution function, standard deviation value, histogram, or other statistical measure of the distribution of performance information, such as timing, area, resource usage, power consumption, switching activity, or any other type of performance information, for the paths composing a metapath.

Following the generation of performance information for the metapaths in step 315, method 300 can present the design in numerical or text formats 320 or in the form of a static or interactive performance visualization 325. In formats 320, the performance information of metaregisters and metapaths can be presented in the form of tables, reports, or other listings of numerical and text data. In an embodiment, formats 320 are presented using an interactive performance analysis application. An interactive performance analysis tool enables designers to view text and numerical information on the design at any level of detail. An embodiment of the interactive performance analysis application enables designers to search for and display metaregisters and metapaths using search or filtering criteria. The search and filtering criteria can include any attribute of a metaregister, metapath, or associated performance information.

In a further embodiment, designers can select a metapath for expansion, thereby presenting further information on the paths and/or metapaths within the selected metapath. Designers can also select one or more paths and/or metapaths connecting two or more metaregisters or registers to be collapsed into a single metapath.

A static or interactive performance visualization 325 presents metaregisters, metapaths, and performance information at any level of detail to designers in the form a graphical display. Embodiments of the performance visualization can include schematics, logic diagrams, directed or undirected graphs, charts, and other graphical presentations. In an embodiment, designers can select a portion of an interactive performance visualization corresponding with a metapath for expansion, thereby presenting further information on the paths and/or metapaths within the selected metapath. Designers can also select one or more paths and/or metapaths connecting two or more metaregisters or registers to be collapsed into a single metapath in the visualization.

Within the visualization, performance information can be presented as graphical and text or numerical annotation to metaregisters and metapaths. For example, each metapath can be labeled with its respective performance information. In another example, metapaths can be color-coded or otherwise visually distinguished based on performance information. In another example, a chart representing a probability distribution function of performance values can be displayed in conjunction with an associated metapath.

In an embodiment, an interactive performance analysis application enables designers to search for and display a visual representation of the metaregisters and metapaths matching search or filtering criteria. The search and filtering criteria can include any attribute of a metaregister, metapath, or associated performance information. The search or filtering criteria can also include a search distance, in which only metapaths and metaregister or registers and paths within a given distance of a selected entity are displayed. Distance can be represented in terms of a number of logic gates, logic cells, paths or metapaths, or registers or metaregisters from a selected entity.

In a further embodiment, a design source code viewer can integrate metaregisters, metapaths, and associated performance information. In this embodiment, designers selecting a metaregister or metapath at any level of detail in the design in either format 320 or 325 can view a corresponding portion of design source code in a register transfer language (RTL), Verilog, VHDL, or other hardware description language. In one implementation of this embodiment, identifying information, such as names, is maintained through the compilation process, which enables metapaths and associated performance information to be linked back with its corresponding source code. For designs to be implemented using a programmable logic device, such as an FPGA, another embodiment similarly displays logic cells, lookup tables, or other programmable device features corresponding with a selected metaregister or metapath.

Figure 4A:
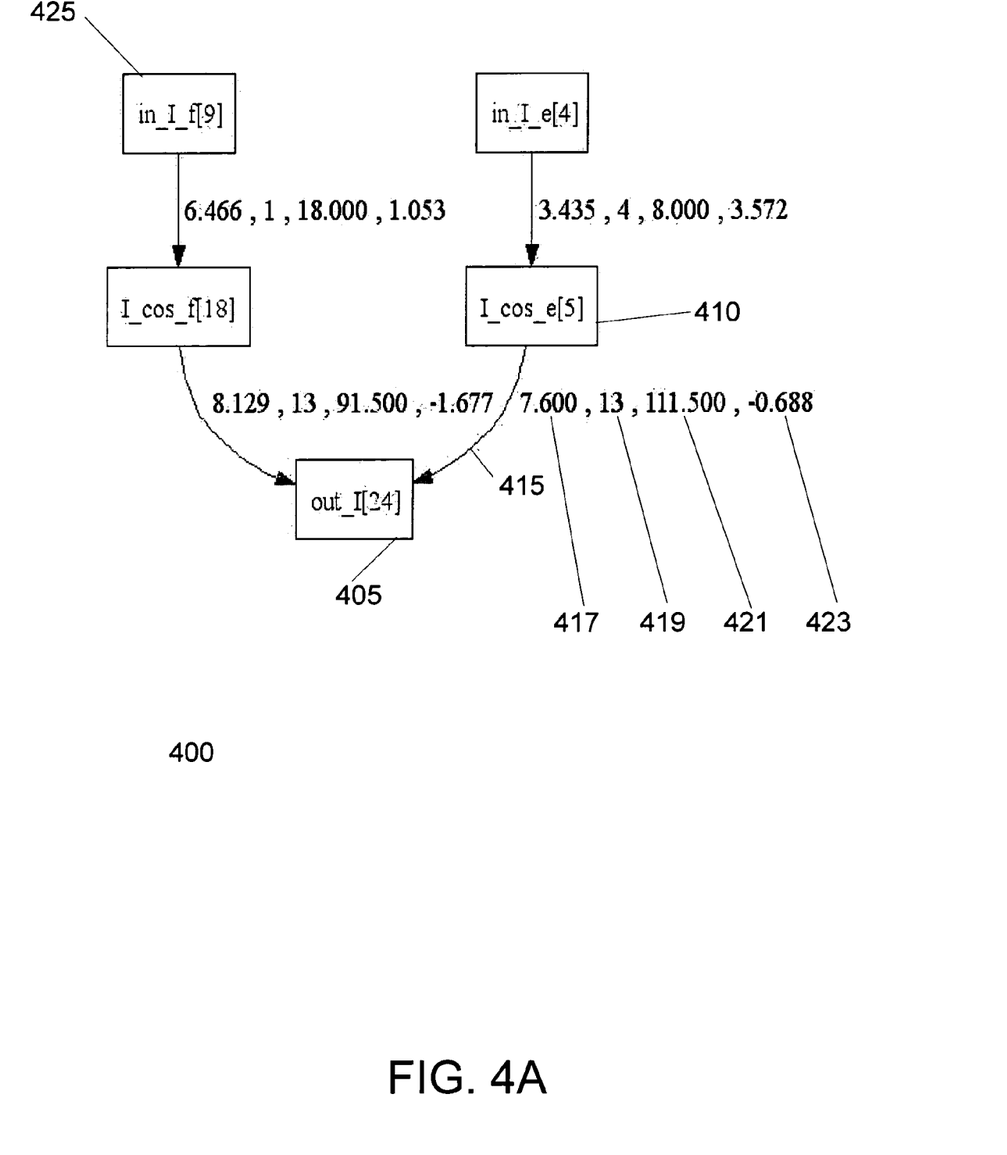
FIGS. 4A-4D illustrate the operation of a performance visualizations system according to an embodiment of the invention.

FIGS. 4A-4D illustrate the operation of a performance visualization system according to an embodiment of the invention. FIG. 4A illustrates a level of detail 400 of a design according to an embodiment of the invention. Level of detail 400 is presented as a graph, with graph nodes representing metaregister or registers and graph connections representing metapaths or paths. For example, level of detail 400 includes metaregisters 405 and 410. In this example, each metaregister is labeled with a metaregister name and additional information, such as the number of bits in the metaregister. Metaregisters 405 and 410 are connected by metapath 415. Metapath 415 represents a number of paths and associated combinational logic gates.

In example level of detail 400, metapath 415 is annotated with performance information including a timing delay value 417; depth value 419, representing the longest sequence of combinatorial logic gates or lookup tables associated with the metapath 415; an area value 421, and a timing slack value 423. Further embodiments of the invention can include performance information pertaining to other aspects of timing, power consumption, area, routing resource usage and congestion, and other performance characteristics of designs.

In an embodiment, level of detail 400 is presented as part of an interactive performance visualization system. By selecting a metapath or metaregister, additional metapaths and metaregisters can be presented to the user. For example, the user may select metaregisters 405 and 425 to reveal additional detail.

Figure 4B:
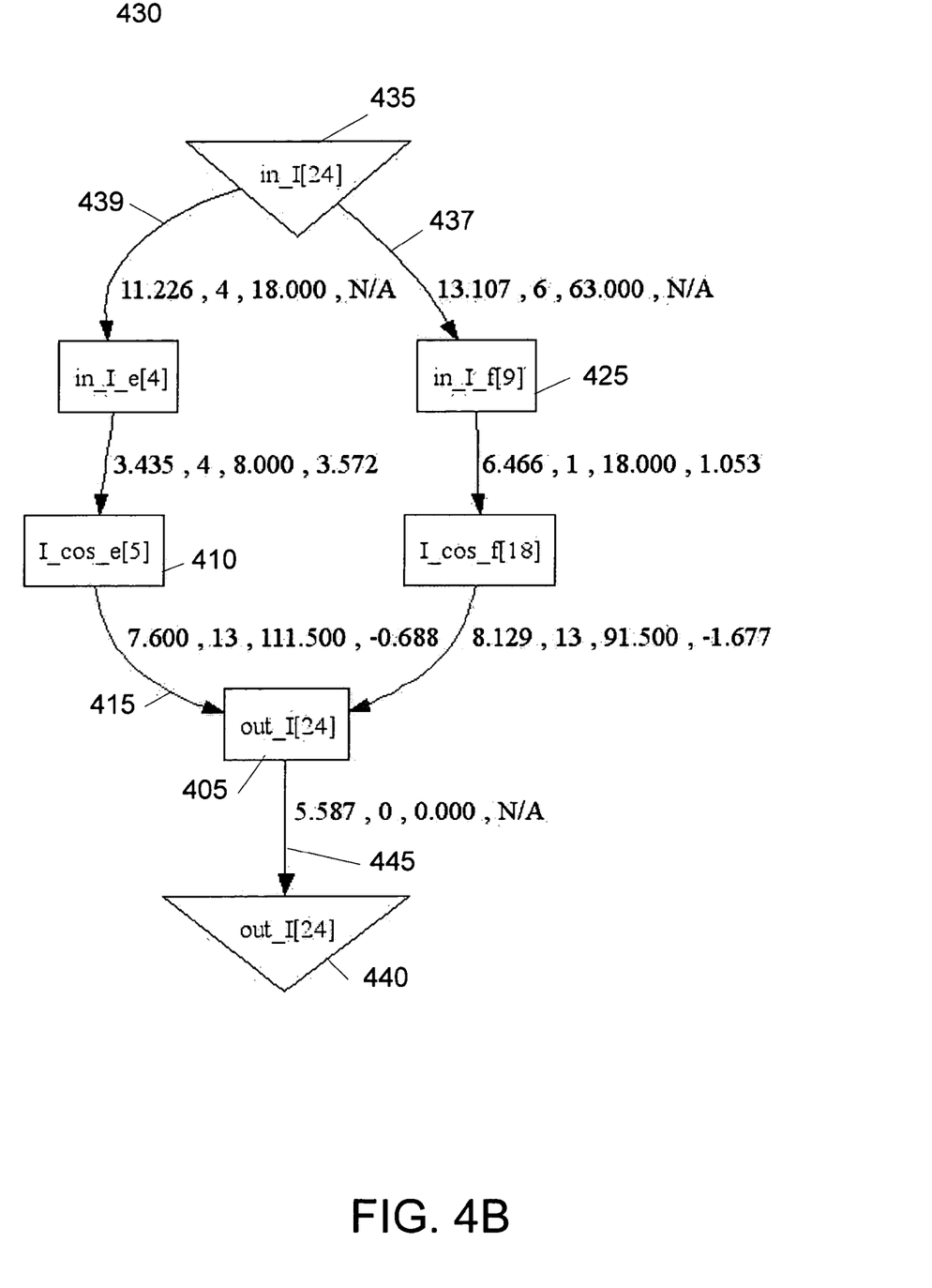

FIG. 4B illustrates a level of detail 430 presented in response to the selection of metaregisters 405 and 425. In response to the selection of metaregister 425, additional metaregister 435, corresponding with one or more input pins of the design, and associated metapaths 437 and 439 are revealed. Similarly, in response to the selection of metaregister 405, additional metaregister 440 and associated metapath 445 are revealed.

Figure 4C:
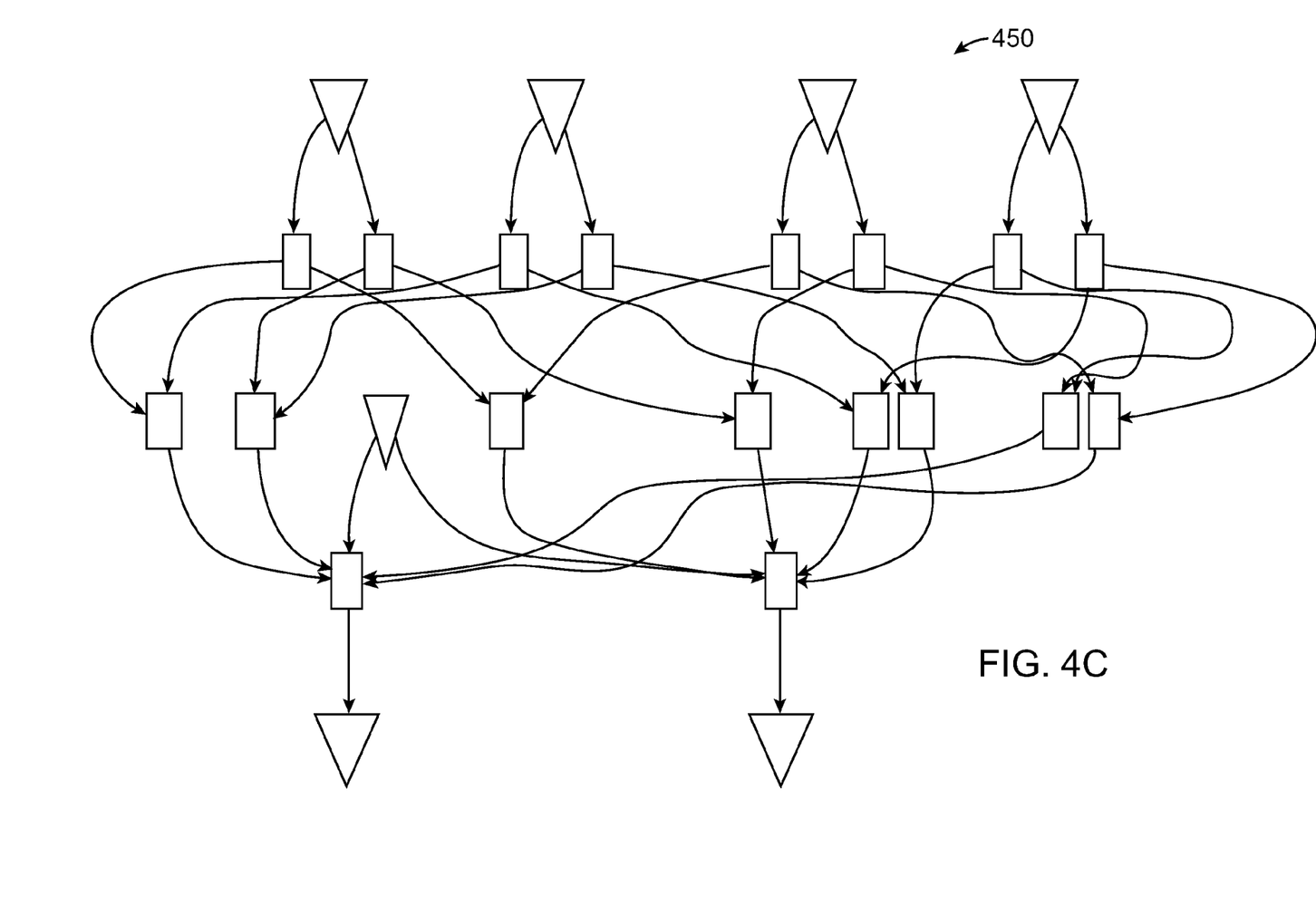

Further metaregisters and metapaths can be selected to reveal additional detail of the design. FIG. 4C illustrates a level of detail 450 presenting additional detail of the design of FIGS. 4A and 4B. Level of detail 450 enables designers to view paths and metapaths in additional detail.

Figure 4D:
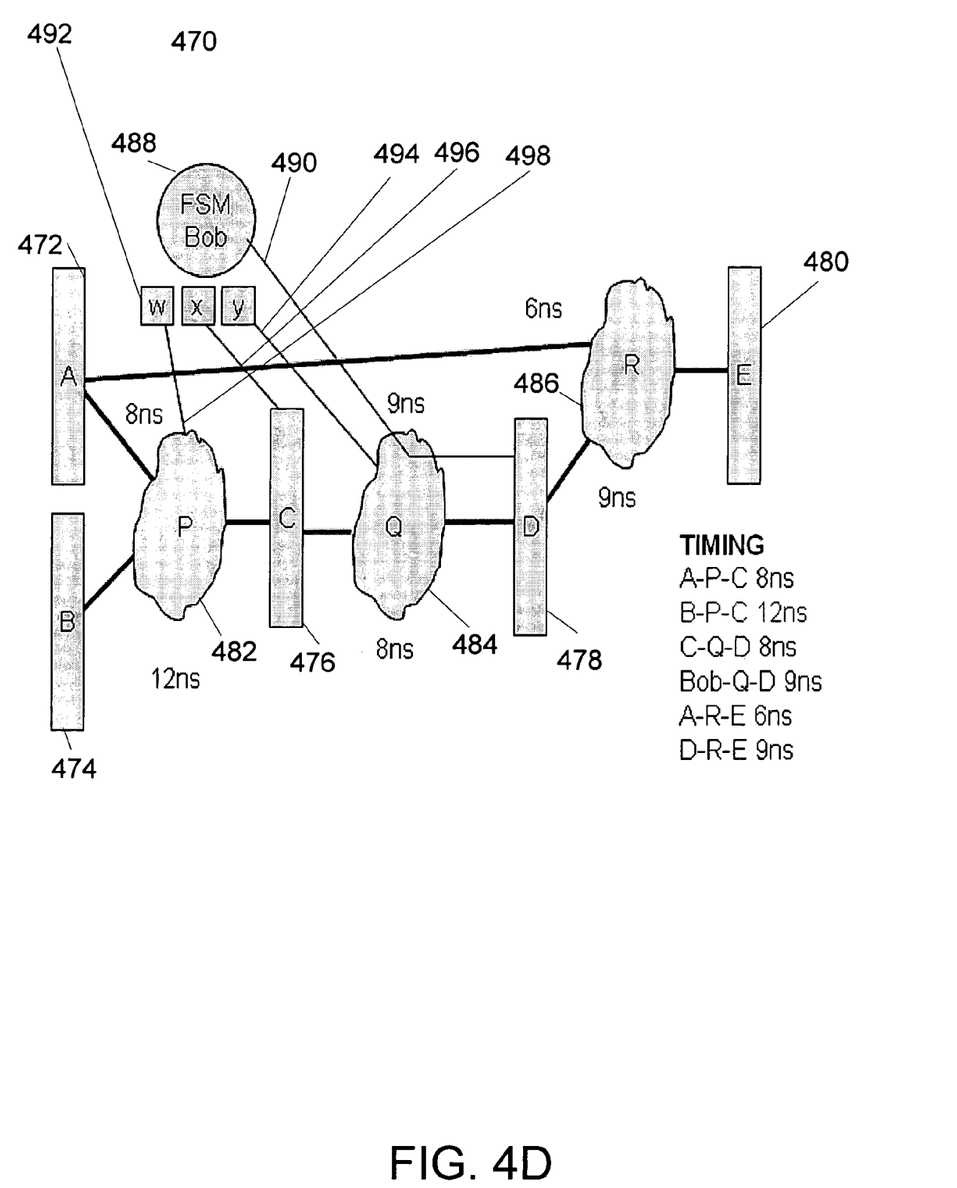

FIG. 4D illustrates a presentation 470 of a design including both paths and metapaths according to an embodiment of the invention. In this embodiment, the paths associated with finite state machines and control signals are not included in metapaths. This assists the designer in understanding the overall function of the design. In this embodiment, paths and associated combinatorial logic gates for data signals are condensed into metapaths.

For example, presentation 470 includes metaregisters 472, 474, 476, 478, and 480. The presentation includes metapaths representing multiple paths and associated combinatorial logic, such as metapaths 482, 484, and 486.

Presentation 472 also includes finite state machine 488. The output signal of finite state machine 488 is path 490, which has not been incorporated into a metapath. Similarly, presentation 472 includes control registers 492. The control signals provided by control registers 492 are carried by paths 494, 496, and 498. These paths are not combined into metapaths.

Figure 5:
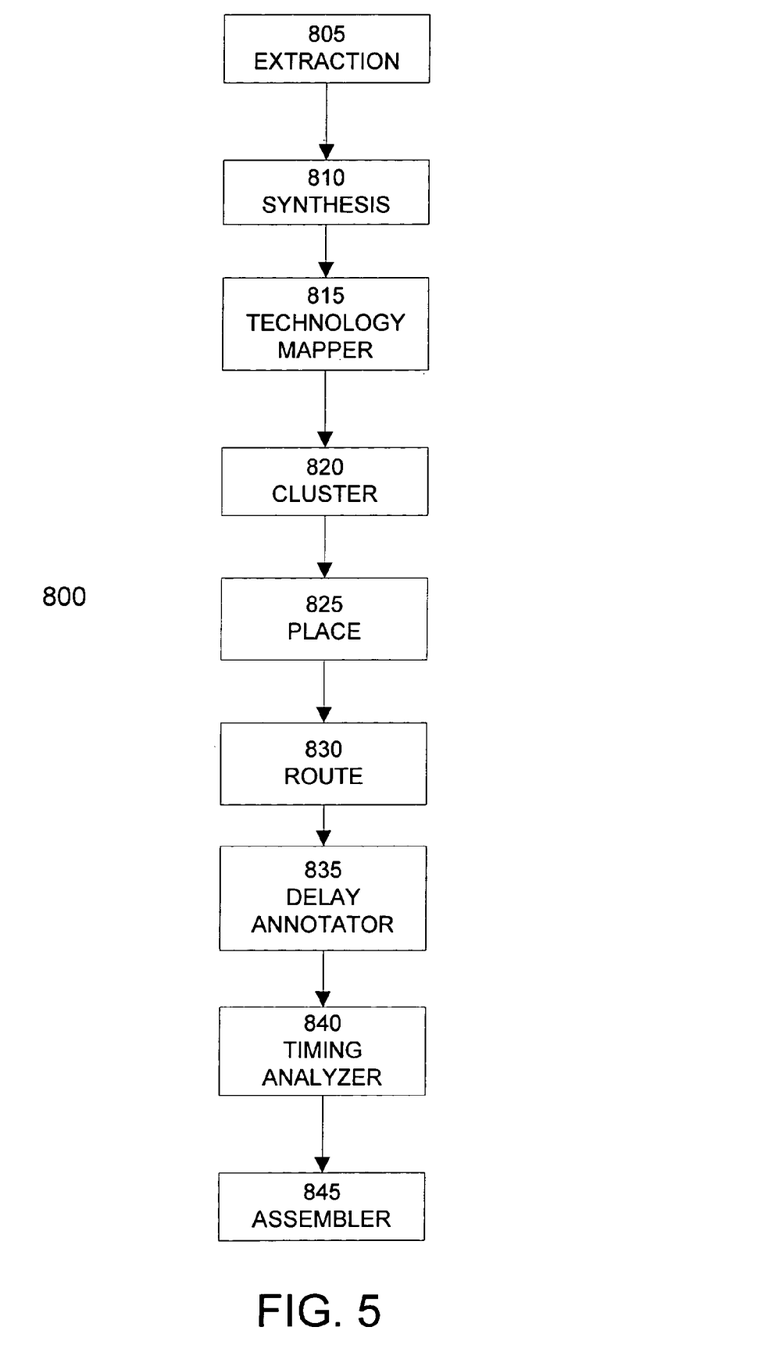
FIG. 5 illustrates a compilation process suitable for use with an embodiment of the invention.

FIG. 5 illustrates an example compilation process 800 suitable for creating configuration data for use with an embodiment of the invention. The compilation process 800 converts a user design into a programmable device configuration adapted to configure a programmable device to implement the user design. The extraction phase 805 converts a description of the user design, expressed for example in a hardware description language, into a register transfer layer description.

Synthesis phase 810 converts the register transfer layer description of the user design into a set of logic gates. Embodiments of the synthesis phase 810 can select between equivalent logic gates to improve resistance to soft errors, as described above. Technology mapping phase 815 subdivides the set of logic gates into a set of atoms, which are groups of logic gates matching the capabilities of the logic cells or other functional blocks of the programmable device. A given user design may be converted into any number of different sets of atoms, depending upon the underlying hardware of the programmable device used to implement the user design.

Following the technology mapping phase 815, the cluster phase 820 groups related atoms together into clusters. The place phase 825 assigns clusters of atoms to locations on the programmable device. The route phase 830 determines the configuration of the configurable switching circuit of the programmable device used to connect the atoms implementing the user design.

The delay annotator phase 835 determines the signal delays for the set of atoms and their associated connections in the configurable switching circuit using a timing model of the programmable device. The timing analysis phase 840 determines the maximum operating speed of the programmable device when implementing the user design, for example by determining the portions of the user design have the largest signal delay.

The assembler phase 845 generates a set of configuration information specifying the configuration of the programmable device implementing the user design, including the configuration of each of the logic cells used to implement the user design and the configuration of the configurable switching circuit used to connect the logic cells. In an embodiment, the assembler phase 845 also generates sensitivity mask data corresponding with the configuration data. In this embodiment, assembler phase identifies the portions of the configuration memory used by the user design and sets sensitivity mask data accordingly. The assembler phase 845 can write the configuration information to a configuration file, which can then be used to configure one or more programmable devices to implement instances of the user design.

Embodiments of performance visualization applications can use timing, power analysis, switching activity, or other performance information determined by the timing analysis phase 840 or other similar performance analysis phases not shown in method 800. In another embodiment, performance visualization applications can use estimated timing or other performance information provided at other phases of method 800. Additional embodiments of performance visualization applications can operate in conjunction with floorplanning applications, enabling designers to designate the placement location of large numbers of paths and combinatorial logic gates by selecting the corresponding metapath. Similarly, embodiments of performance visualization applications may enable designers to specify large numbers of paths and combinatorial logic gates for special processing or optimization by selecting the corresponding metapath. In a further embodiment, designers can use the performance visualization application to select metapaths with large amounts of switching activity and move the nodes associated with these selected metapaths closer together to minimize wire capacitance and dynamic power consumption.

Figure 6:
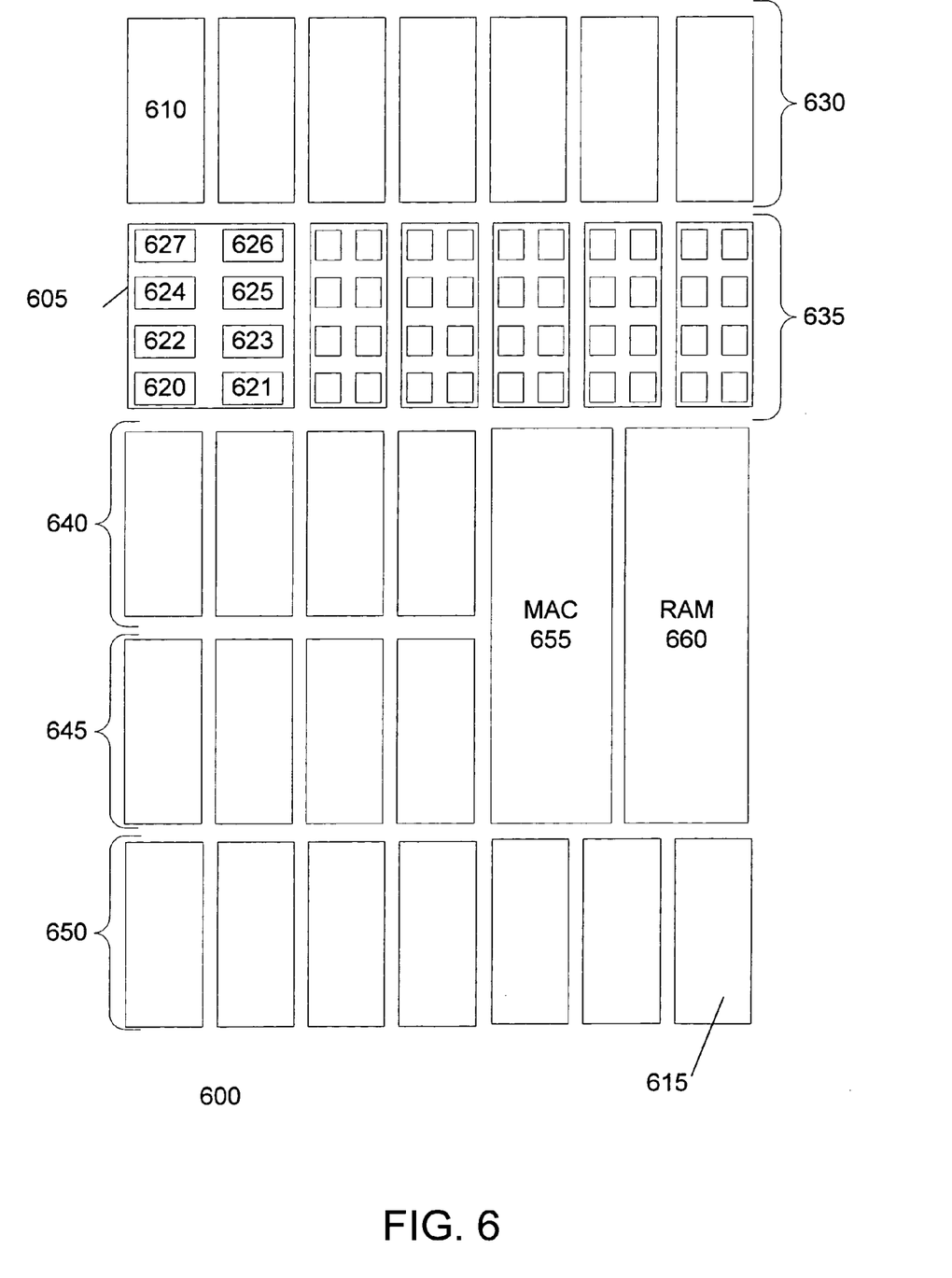
FIG. 6 illustrates a programmable device suitable for implementing designs processed by an embodiment of the invention.

FIG. 6 illustrates an example programmable device suitable for implementing an embodiment of the invention. Programmable device 600 includes a number of logic array blocks (LABs), such as LABs 605, 610, 615. Each LAB includes a number of programmable logic cells using logic gates and/or look-up tables to perform logic operations, as well as registers to store and retrieve data. LAB 605 illustrates in detail logic cells 620, 621, 622, 623, 624, 625, 626, and 627. Logic cells are omitted from other LABs in FIG. 6 for clarity. The LABs of device 600 are arranged into rows 630, 635, 640, 645, and 650. In an embodiment, the arrangement of logic cells within a LAB and of LABs within rows provides a hierarchical system of configurable connections of a programmable switching circuit, in which connections between logic cells within a LAB, between cells in different LABs in the same row, and between cell in LABs in different rows require progressively more resources and operate less efficiently.

In addition to logic cells arranged in LABs, programmable device 600 also include specialized functional blocks, such as multiply and accumulate block (MAC) 655 and random access memory block (RAM) 660. The configuration of the programmable device is specified at least in part by configuration data stored in configuration memory 675. The configuration data can include values for lookup tables defining the functions of logic cells; values of control signals for multiplexers and other switching devices used by the configurable switching circuit to route signals between inputs, outputs, logic cells, and functional blocks; and values specifying other aspects of the configuration of the programmable device, such as modes of operation of the programmable device and its assorted functional blocks and logic cells. Configuration memory 675 can also include guardian CRAM cells as described above. Although the configuration memory 675 is shown in FIG. 6 as a monolithic unit, in some programmable devices, configuration memory 675 is scattered all over the programmable device. In these types of programmable devices, portions of the configuration memory can lie within the logic cells, functional blocks, and configurable switching circuit of the programmable device.

For clarity, the portion of the programmable device 600 shown in FIG. 6 only includes a small number of logic cells, LABs, and functional blocks. Typical programmable devices will include thousands or tens of thousands of these elements.

Figure 7:
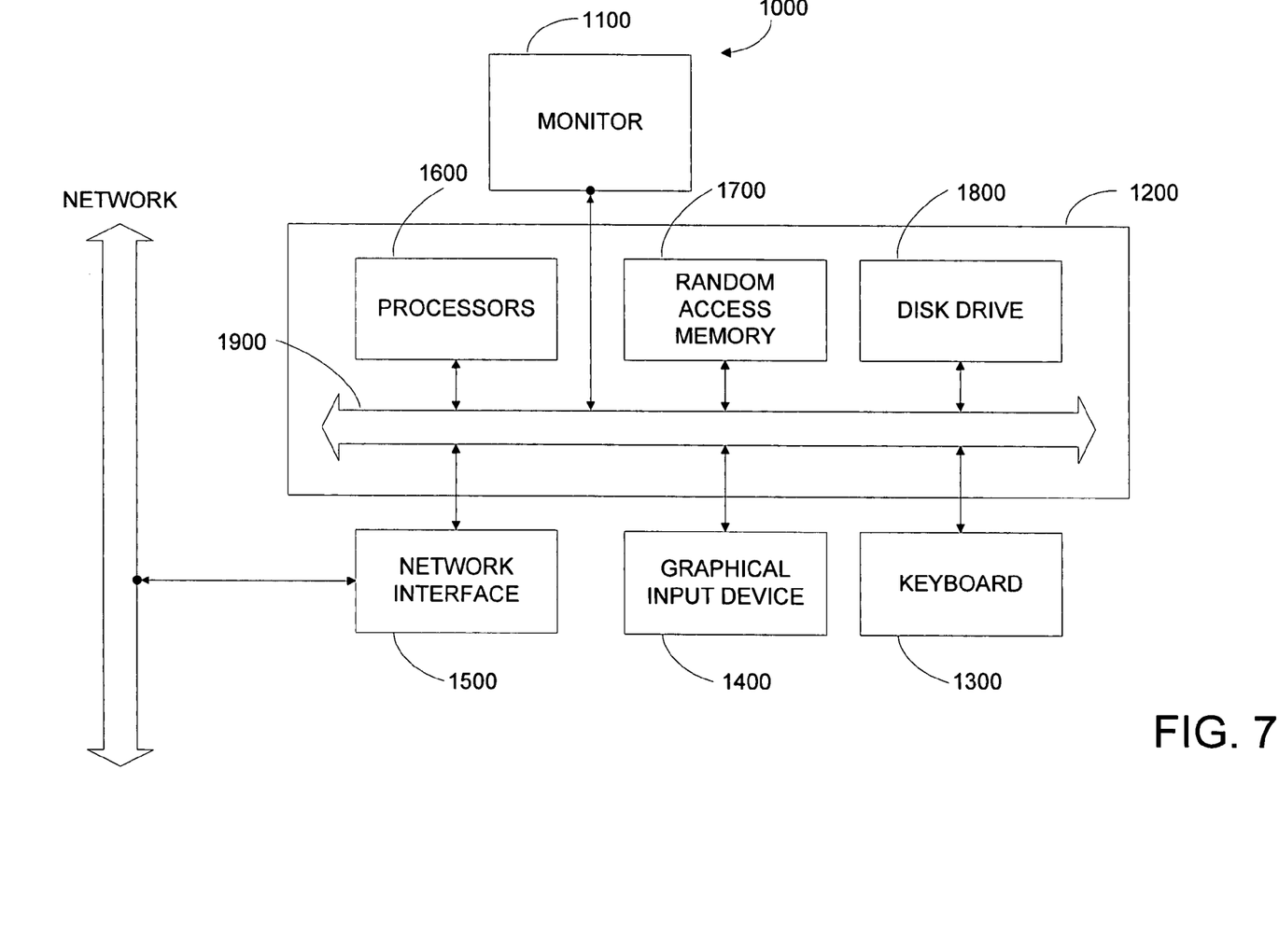
FIG. 7 illustrates a computer system suitable for implementing an embodiment of the invention.

FIG. 7 illustrates a computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. For example, although the invention has been discussed with reference to programmable devices, it is equally applicable to performance visualization applications used to analyze any type of digital device, such as standard or structured ASICs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer system for visualizing performance of a digital design of an integrated circuit that is not part of the computer system, the computer system programmed with a set of instructions comprising:
   receiving, at the computer system, design source code specifying connections of circuit elements of the digital design of the integrated circuit, wherein the digital design includes registers connected together by combinatorial logic, each register having one or more register bits that store bits of data;
   determining a first node representing a first metaregister, wherein the first metaregister comprises a first portion of the register bits in the digital design, each register bit being of a register of the digital design, wherein each register bit of the first portion has a first characteristic;
   determining a second node representing a second metaregister, wherein the second metaregister comprises a second portion of the register bits in the digital design, wherein each bit of the second portion has a second characteristic;
   determining a graph connection from the first node to the second node, the graph connection representing a metapath comprising a plurality of paths and associated combinatorial logic between the first and second metaregisters;
   displaying the first node, the second node, and the graph connection on a monitor coupled with the computer system, thereby allowing a user of the computer system to visualize a performance of the digital design; and
   displaying performance information of the metapath on the monitor, wherein the graph connection includes an annotation providing the performance information of the metapath.

2. The computer system of claim 1, wherein the performance information includes timing information.

3. The computer system of claim 1, wherein the performance information includes power consumption information.

4. The computer system of claim 1, wherein the performance information includes area information.

5. The computer system of claim 1, wherein the performance information includes switching activity information.

6. The computer system of claim 1, wherein the performance information includes an aggregate representation of performance information of the plurality of paths.

7. The computer system of claim 6, wherein the aggregate representation of performance information includes a histogram.

8. The computer system of claim 1, wherein the graph connection is adapted to display at least a portion of the plurality of paths and associated combinatorial logic of the metapath in response to a user input.

9. The computer system of claim 8, wherein the displayed portion of the plurality of paths and associated combinatorial logic are adapted to be collapsed into the graph connection in response to a second user input.

10. The computer system of claim 1, further comprising:
a third node representing a third metaregister comprising at least one register bit of a third register; and
wherein the graph connection further connects the third and second nodes and wherein the graph connection represents a plurality of paths and associated combinatorial logic between the third and second metaregisters.

11. The computer system of claim 1, further comprising:
an additional graph connection representing at least one control signal.

12. The computer system of claim 1, further comprising:
an additional graph connection representing at least one output of a finite state machine.

13. The computer system of claim 1, wherein:
the first and second nodes are a result of register folding of a plurality of register bits of the digital design; and
the graph connection is a result of a comb-cone traversal to identify the plurality of paths and associated combinatorial logic between the first and second metaregisters.

14. The computer system of claim 1, wherein the first characteristic includes being associated with a common bus.

15. The computer system of claim 14, wherein register bits associated with a bus having a width less than a tolerance value are not combined into a metaregister.

16. The computer system of claim 1, wherein the design source code is provided in a programming language for designing circuits, and wherein the programming language is selected from the group consisting of RTL, Verilog, and VHDL.

17. The computer system of claim 1, wherein the annotation is displayed adjacent the graph connection.

18. A method of using a computer system to generate a visualization of a performance of a design for an integrated circuit, the method comprising:
prior to generating a set of configuration information specifying a configuration of the integrated circuit to implement the design:
receiving, at the computer system, design source code that specifies connections of circuit elements in the design, wherein the design includes a plurality of register bits, a plurality of paths, and associated combinatorial logic connecting the plurality of register bits;
combining, with the computer system, a first portion of the plurality of register bits into a first metaregister, wherein each register bit of the first portion has a first characteristic;
combining, with the computer system, a second portion of the plurality of register bits into a second metaregister, wherein each bit of the second portion has a second characteristic;
identifying, with the computer system, a portion of the plurality of paths and associated combinatorial logic connecting the first and second metaregister;
forming, with the computer system, a metapath representing the identified portion of the plurality of paths and associated combinatorial logic;
displaying, with the computer system, a first node corresponding with the first metaregister, a second node corresponding with the second metaregister, and a graph connection corresponding with the metapath; and
displaying an annotation with the graph connection, wherein the annotation indicates performance information associated with the portion of the plurality of paths and associated combinatorial logic of the metapath.

19. The method of claim 18, wherein displaying an annotation includes:
aggregating the performance information associated with the portion of the plurality of paths and associated combinatorial logic of the metapath to determine an aggregate representation of performance information.

20. The method of claim 18, wherein combining the first and second portions of the plurality of register bits includes register folding.

21. The method of claim 18, wherein identifying a portion of the plurality of paths and associated combinatorial logic includes comb-cone traversal.

22. The method of claim 18, further comprising:
identifying a path associated with a control signal; and
displaying an additional graph connection representing the control signal.

23. The method of claim 18, further comprising:
identifying a path associated with a finite state machine; and
displaying an additional graph connection representing the output of a finite state machine.

24. A tangible computer readable medium storing a plurality of instructions for controlling a computing system to perform an operation for visualizing performance of a digital design of an integrated circuit that is not part of the computer system, the instructions comprising:
receiving, at the computer system, design source code specifying connections of circuit elements of the digital design of the integrated circuit, wherein the digital design includes registers connected together by combinatorial logic, each register having one or more register bits that store bits of data;
determining a first node representing a first metaregister, wherein the first metaregister comprises a first portion of the register bits in the digital design, each register bit being of a register of the digital design, wherein each register bit of the first portion has a first characteristic;
determining a second node representing a second metaregister, wherein the second metaregister comprises a second portion of the register bits in the digital design, wherein each bit of the second portion has a second characteristic;
determining a graph connection from the first node to the second node, the graph connection representing a metapath comprising a plurality of paths and associated combinatorial logic between the first and second metaregisters;
displaying the first node, the second node, and the graph connection on a monitor coupled with the computer system, thereby allowing a user of the computer system to visualize a performance of the digital design; and
displaying performance information of the metapath on the monitor, wherein the graph connection includes an annotation providing the performance information of the metapath.

25. The computer readable medium of claim 24, wherein the performance information includes an aggregate representation of performance information of the plurality of paths.

* * * * *